United States Patent [19]

Mellows

[11] 4,051,280
[45] Sept. 27, 1977

[54] PROCESS FOR COATING TO FORM A FOAM FIND PROTECTIVE PACKAGE

[75] Inventor: Frank W. Mellows, Columbia, Md.

[73] Assignee: Westvaco Corporation, New York, N.Y.

[21] Appl. No.: 584,949

[22] Filed: June 9, 1975

[51] Int. Cl.² ............................................. B05D 3/02
[52] U.S. Cl. .................................... 427/373; 156/322;
427/382; 427/391; 427/395; 427/411; 428/315;
428/320; 428/349; 428/354; 428/516
[58] Field of Search ............... 428/516, 520, 518, 522,
428/342, 913, 349, 537, 511, 310, 311, 315, 320,
354; 427/373, 385, 207, 382, 391, 395, 411;
156/322

[56] References Cited

U.S. PATENT DOCUMENTS

| | | | |
|---|---|---|---|
| 3,061,460 | 10/1962 | Schickedanz | 260/2.5 |
| 3,180,778 | 4/1965 | Rinderspacher et al. | 156/322 |
| 3,497,416 | 2/1970 | Critchfield et al. | 428/245 |
| 3,788,876 | 1/1974 | Baker et al. | 427/207 |
| 3,829,343 | 8/1974 | Permmert | 156/322 |
| 3,924,796 | 12/1975 | Rausing et al. | 428/315 X |

OTHER PUBLICATIONS

Tappi, vol. 54, No. 2, Feb. 1971, pp. 257-261.

*Primary Examiner*—Thomas J. Herbert, Jr.

[57] ABSTRACT

A laminated protective packaging material particularly for use in making heat sealable envelopes comprises an outer paper substrate having a continuous, aqueous based heat sensitizable coating applied to one surface thereof. The outer paper substrate may consist of conventional coated or uncoated paper, bleached or unbleached kraft paper or any other similar material. The heat sensitizable coating may consist of an alkali-soluble ethylene-acrylic acid copolymer resin or other heat sensitizable ionic polymer resin with or without the addition of filler materials for increasing the viscosity of the coating and/or for improving the heat sealing characteristics of the coating. The heat sensitizable coating is particularly characterized by its ability to be heat sealed to itself and laminated to a foamed polymeric material having a cellular structure such as polyethylene foam.

1 Claim, No Drawings

PROCESS FOR COATING TO FORM A FOAM FIND PROTECTIVE PACKAGE

BACKGROUND OF INVENTION

Packaging laminates consisting of combinations of cellular foamed materials such as polystyrene and polyurethane with textile, paper or other synthetic laminates are well known. U.S. Pat. Nos. 3,829,343 and 3,861,994 each teach different laminated products of the class just described. However, in the prior art products, the laminates have been prepared from materials which either required hot melt extrusions or flame lamination techniques, to adhere the different components to one another. Thus, the processes required to produce the prior art products have been found to be either undesirable or uneconomical in practice. In addition, the prior art products have not had the ability of being heat sealable to themselves for closing the packages made from the products thus requiring expensive and unusual methods in their actual use. On the other hand, heat sensitizable compositions useful in closing paperboard cartons are known as taught by U.S. Pat. 3,788,876. However, the application of such heat sensitizable compositions have not been used to produce a continuous adherent coating having the qualities of being heat sealed to itself and particularly heat sealable to a polyethylene foam material as in the present invention. In the past, only extruded polyethylene has been used to adhere polyethylene foam to a paper substrate.

SUMMARY OF INVENTION

The present invention relates in general to a novel packaging material consisting of an outer paper substrate having a continuous, aqueous based, heat sensitizable coating applied to one surface thereon. In particular, the present invention is directed to such a product for use in making heat sealable envelopes where the heat sensitizable coating further has adhered to the surface thereof a polymeric material having a cellular structure such as polyethylene foam. Thus the heat sensitizable coating applied to the outer paper substrate is characterized as being heat sealable to itself and capable of being heat sealed to a foam material without producing any detrimental effects to either the foam material or the outer substrate.

The heat sensitizable coating of the present invention is also unique in that is is capable of being applied to the outer paper substrate using any conventional coating applicator such as by rolling, dipping, air knife or blade. Such varied application is possible because the coating is based on an aqueous system as conventionally used in the paper industry. In addition, the heat sensitizable coating may be modified with the addition of pigments or other filler materials for increasing the viscosity of the coating and/or for improving the heat sealing characteristics of the coating. Such modifications may be required depending upon the type of applicator used to apply the coating to the substrate.

Several materials have been found to perform satisfactorily as the heat sensitizable coating for the present invention. For instance, PCX 300, a thermoplastic, alkali dispersible, ethylene-acrylic acid copolymer supplied by Union Carbide Corporation, when prepared in a dispersion, produces excellent results. In general, the copolymer may contain from 15-30% acrylic acid, however an 80% ethylene-20% acrylic acid blend has a melt index of about 200-300 decigrams/minute, a melting point of 89° C., a specific gravity of 0.960 and a bulk density of 35 lbs./cuft. Use of the material in pigmented coatings for paper is fully described in TAPPI magazine, Vol. 54 No. 2, February 1971 at pages 257-261. A 25% solids dispersion of PCX 300 is prepared by charging a covered vessel with an aqueous mixture of 20 parts ammonia per 100 parts of dry PCX 300 together with a defoamer. The mixture is heated to about 200° F., held at that temperature for about 30 minutes and allowed to cool to room temperature with constant stirring. After the coating is applied, it is readily melted at a temperature in excess of 160° F.

Another material found useful in the present invention is an aqueous resin dispersion of an ionic polymer sold under the tradename "Surlyn" by E. I. Du Pont de Nemours and Company. The commercially available dispersions sold as "Surlyn" D-1230, D-1050 and D-1052 have a solids of between about 42-45%, a viscosity of from about 70-2500 cps (Brookfield, #2 spindel at 20 rpm) a particle size of about 0.5 micron and a pH of about 9.5. The dispersions form a film at about 120°-170° F. and after drying are readily melted at temperatures above 180° F. The dispersions contain approximately 42% solids based on the ionic polymer present whose molecular weight varies from about 100 to 200 million.

In the practical application of either of the above noted dispersions as a continuous coating for paper, the materials require fillers to achieve runnable viscosities and to produce coat weights suitable for self sealing and for sealing to foam. Thus when the "Surlyn" dispersions or PCX 300 dispersions are filled with a powdered polyethylene material substantially as disclosed in U.S. Pat. No. 3,788,876, more reliable and reproducible results are obtained. The preferred polyethylene fillers have a particle size in the range of from about 8-30 microns with a melt index (grams/10 minutes) from 5-22. The densities of such powdered polyethylene will range from about 0.914 to 0.924 (gram/cubic cm.). Powdered polyethylenes having these characteristics can be purchased commercially from U.S.I. Chemicals, as Microthene FN500 and FN510.

DETAILED DESCRIPTION

The present invention is believed to be best described with the aid of the following Examples.

EXAMPLE I

A 60 lb/ream (ream size 25×38 inches, 500 sheets) basis weight rawstock of envelope paper was applied in web form with a heat sensitizable coating in an on-machine operation using an air knife coater. The coating consisted of a dispersion of PCX 300 at 25% solids having a viscosity of about 100-120 cps (Brookfield #2 spindel at 20 rpm) at room temperature. The coat weights applied ranged from about 2.9 to 4.3 lbs./ream. Samples of the coated web were tested to determine their self sealing ability with a Sentinel Heat Sealer (Laboratory model 12A). For this purpose, samples 3 inches in width were placed in the sealer at about 300° F. and 4 psi. pressure for a dwell time of about 0.7 seconds. The results demonstrated that for the coat weights greater than about 3 lbs/ream, the product would successfully seal to itself. Meanwhile, all of the samples were rated excellent for their ability to be heat sealed to polyethylene foam at a uniform pressure application of about 2-3 psi.

EXAMPLE II

Drawdowns were made on a 61 lb./ream Wickliffe Clear Spring Woven basestock (manufactured by Westvaco Corporation) by wire wound rod with three different coatings comprised of dispersions of "Surlyn" D-1230, D-1052 and D-1050 at about 40% solids. The coat weights applied ranged from about 1.0 to 5.4 lbs./ream as determined gravimetrically by weighing the sheets before and immediately after coating without drying. Samples were tested for their self sealing ability substantially as set forth in Example I and the results demonstrated that a minimum coat weight of about 4 lbs/ream was required to achieve satisfactory self sealing. Heat sealing to foam was satisfactory with coat weights as low as 2 lbs/ream.

EXAMPLE III

An aqueous PCX 300 dispersion was prepared in the normal way at 25% solids using 20 parts of 28% ammonia per 100 parts of dry PCX 300. The resin, water and ammonia together with 0.5% Foamaster VL defoamer (based on weight of PCX 300) were heated with stirring in a closed vessel at 200° F., held at that temperature for 30 minutes and allowed to cool to room temperature with constant stirring throughout. Coatings were then prepared by adding Microthene FN500 polyethylene powder to the PCX 300 dispersion and mixing for about one minute in a Waring Blender at ratios of PCX 300 to Microthene FN500 of 25/75 and 50/50. The coatings were applied to a 60 lbs/ream Wickliffe envelope basestock by wire wound rod at coat weights ranging from 3.4 to 5.2 lbs/ream. The solids content of the 25/75 mixture was about 44% while the solids content of the 50/50 mixture was about 36.7%. Samples were tested as before and the results obtained showed that the heat sensitizable coatings would seal to foam at all coat weights. However, with the 25/75 mixture self sealing failed at the lower coat weights and was only marginal at 5.2 lbs/ream. With the 50/50 mixture, satisfactory self sealing ability was achieved at 4 lbs/ream coat weight.

EXAMPLE IV

An aqueous PCX 300 dispersion was prepared at 24.5% solids using 19 parts of 28% ammonia per 100 parts of dry PCX 300. Coatings were made up by mixing different ratios of the PCX 300 dispersion to Microthene FN500 polyethylene powder in a Waring Blendor for 2 minutes, the final solids content were measured and viscosities were determined at 78°-80° F. The coatings were applied to a 60 lbs/ream Wickliffe basestock by wire wound rod and the heat sealing characteristics of the coatings were determined. Coat weights were determined by extraction of the coatings in boiling solvent (80% toluene-20% 1-butanol). Heat seal performance was made with a Sentinel Sealer (Laboratory Model 12A) using 3 seconds contact time at 300° F. and finger-tip pressure for self sealing and approximately 2-3 psi pressure for foam sealing. The results are shown in Table I below.

TABLE I

| PCX 300/ Microthene FN500 | Solids % | Viscosity cps | Coat wt. #/ream | Heat Sealing Self | Heat Sealing Foam |
|---|---|---|---|---|---|
| 100/0 | 25 | 500 | 5 | OK | OK |
| 50/50 | 37 | 230 | 4 | OK | OK |
| 43/57 | 37 | 90 | 4 | OK | OK |
| 35/65 | 40 | 60 | 4 | OK | OK |
| 30/70 | 42 | 60 | 4.5 | OK | OK |
| 25/75 | 45 | 60 | 4.5 | Marg. | OK |

The results in Table I show that the optimum blend of PCX 300/Microthene FN500 for heat sealing is achieved at a Microthene FN500 content of between about 50 and 70%. At higher levels of Microthene FN500, the minimum coat weight for satisfactory self sealing increases from 4 to 5 lbs/ream, and at lower levels, the increase in viscosity requires a reduction in coating solids that could limit the machine speed at which the coating is applied and also limit the type of coating applicator that could be used to apply the coating.

Thus it may be seen that the packaging laminate prepared in accordance with the present invention performs its requirements of being heat sealable to itself and capable of being heat sealed to a polyethylene foam material at coat weights as low as 3 lbs/ream, with a continuous coating of a dispersion of PCX 300. Similarly, the coatings employing the "Surlyn" resins produced acceptable sealing properties at a minimum coat weight of about 4 lbs/ream, while the coatings containing Microthene FN500 polyethylene powder produced good sealing properties at 4 lbs/ream with from about 50 to 70% Microthene FN500 in the coating. Other experiments (not shown herein) with PCX 300 coatings including pigments such as clay and chalk showed that good heat sealing characteristics could be obtained with coat weights containing a minimum of 3 lbs/ream of resin. Thus a coating containing 75% pigment and 25% PCX 300 would require a total coat weight applied of 12 lbs/ream and with 50% pigment, 6 lbs/ream.

The Examples set forth hereinbefore are intended to be illustrative only and should not be construed as limiting the scope of the invention, as defined by the appended claims.

What is claimed is:

1. A method of producing a packaging material particularly for use in making heat sealable protective envelopes, said packaging material consisting of an outer paper substrate, an aqueous based heat sensitizable coating applied to one surface of said substrate and a foamed polymeric material of cellular structure adhered to substantially the entire area of the coated surface of said substrate comprising:
   a. forming an aqueous coating of powdered polyethylene and a copolymer of ethylene and acrylic acid, said coating comprising from about 30 to 100 parts of a copolymer consisting of from about 70-85% ethylene and from about 30-15% acrylic acid and up to about 70 parts of a powdered polyethylene material having a particle size in the range of from about 10-30 microns, said coating having a solids content of from about 25 to 45%;
   b. applying a continuous film of said coating uniformly to one surface of a paper substrate to produce a coat weight of at least about 3 pounds per ream;
   c. drying said coating;
   d. adhering a polyethylene foam material to substantially the entire area of the coated surface of said substrate under the influence of heat and pressure while leaving portions of said coating surface exposed to be heat sealed to themselves; and,
   e. heat sealing said exposed surfaces to one another to form a foam lined protective envelope.

* * * * *